(12) United States Patent
Hu et al.

(10) Patent No.: US 6,475,000 B1
(45) Date of Patent: Nov. 5, 2002

(54) ELECTRONIC CARD CONNECTOR

(75) Inventors: JinKui Hu; ZiQiang Zhu; Guohua Zhang, all of Kunsan (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/997,524

(22) Filed: Nov. 29, 2001

(51) Int. Cl.⁷ ................................................. H01R 12/20
(52) U.S. Cl. .......................................... 439/79; 439/159
(58) Field of Search ............................ 439/79, 159, 160

(56) References Cited

U.S. PATENT DOCUMENTS

| | | | | |
|---|---|---|---|---|
| 5,876,222 A | * | 3/1999 | Gardner et al. | 439/79 |
| 6,062,878 A | * | 5/2000 | Kuo | 439/79 |
| 6,065,978 A | * | 5/2000 | Dehan et al. | 439/79 |
| 6,135,789 A | * | 10/2000 | Lai et al. | 439/79 |

\* cited by examiner

*Primary Examiner*—Gary Paumen
(74) *Attorney, Agent, or Firm*—Wei Te Chung

(57) ABSTRACT

A card connector includes an insulative housing retaining a plurality of contacts. The contacts have connection portions and soldering portion. Two projections are formed on a front face of the housing defining a space therebetween for receiving a spacer. The spacer forces the connecting portions of the contacts to be aligned with each other in a horizontal surface for enhancing subsequent SMT operation.

1 Claim, 4 Drawing Sheets

ELECTRONIC CARD CONNECTOR

BACKGROUND OF THE INVENTION

1. Field of the Invention

The present invention relates to an electrical connector, and more particularly to a card connector for selective connection of an electronic card, such as a memory card, to an electrical device.

2. Description of the Related Arts

As is well known, a card connector allows a card, such as a memory card, to be selectively connected to an electronic device, such as a printed circuit board (PCB). The card connector generally has an insulative housing, which retains a number of conductive contacts, for example 50 contacts, which forms electrical path between the card and the PCB. The card connector is generally mounted on the PCB by Surface Mount Technology (SMT). The SMT process requires soldering tails of the contacts to be perfectly aligned with each other. However, due to manufacturing tolerance, it is difficult to make the soldering tails in perfect alignment. This causes certain problems in the SMT process.

In addition, even all contacts can be made in perfect alignment with each other in the manufacturing process, the alignment may be damaged during handling and transportation of the card connector by being hit or impacted by an external object.

SUMMARY OF THE INVENTION

In view of the above, an object of the present invention is to provide a card connector of which soldering tails of contacts are in perfect alignment.

Another object of the present invention is to provide a card connector of which contacts are protected from damage by external objects.

To attain the objects, a card connector comprises an insulative housing retaining a plurality of contacts in a horizontal plane. The contacts have connection portions extending in a vertical direction and soldering portion extending from the connecting portion in a horizontal direction. Two projections are formed on a front face of the housing defining a space therebetween for receiving a spacer. The spacer has a back surface that interferentially contacts and forces the connecting portions of the contacts to be aligned with each other in a horizontal surface for enhancing subsequent SMT operation. The spacer has a lower face that can be selectively contacting the soldering portions of the contacts for ensuring proper alignment between the soldering portions.

Other objects and advantages of the present invention will be understood from the following description of a preferred embodiment of the present invention, with reference to accompanying drawing, wherein:

BRIEF DESCRIPTION OF THE INVENTION

DETAILED DESCRIPTION OF PREFERRED EMBODIMENT

Figure 1:
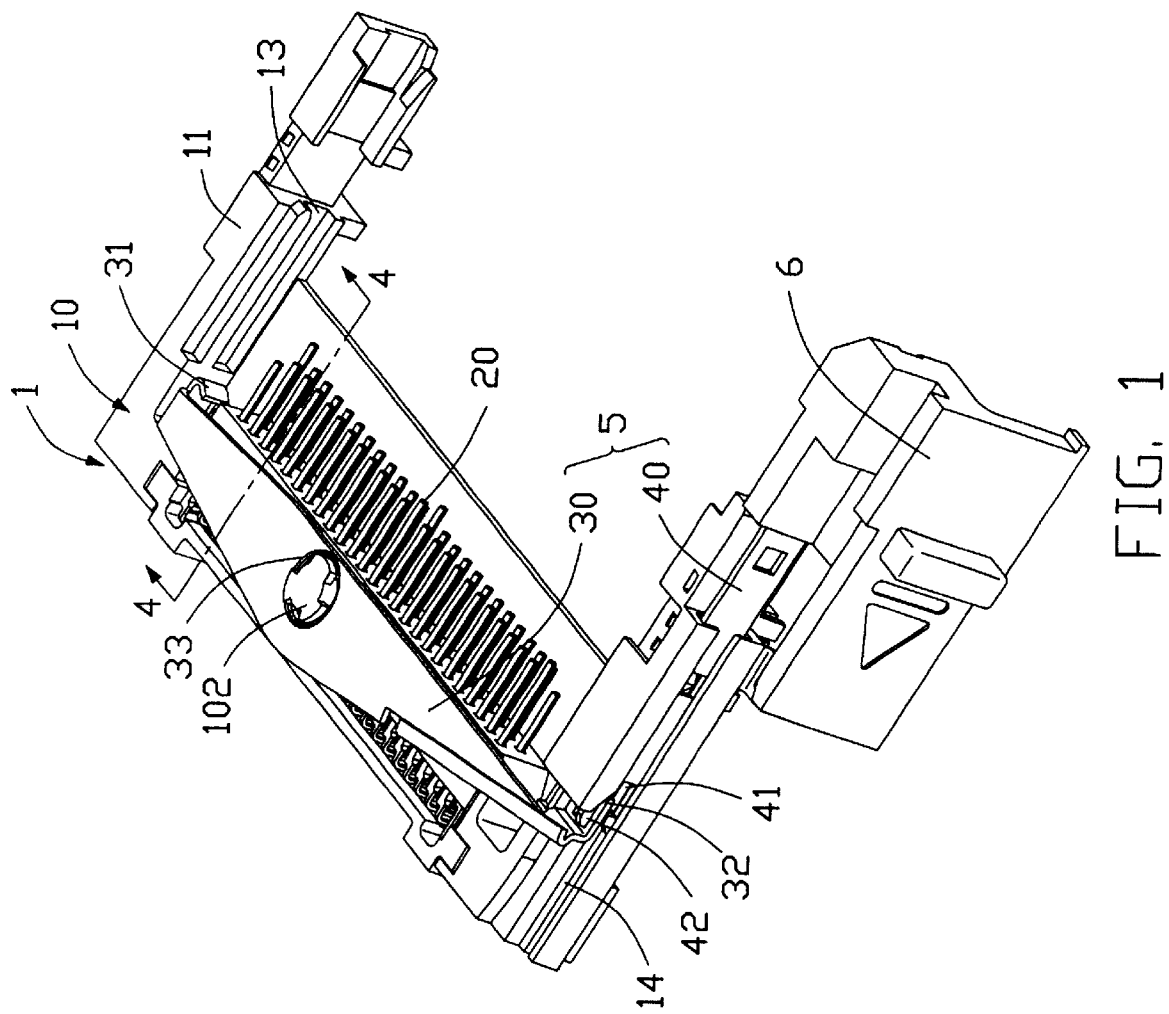
FIG. 1 is a perspective view of a card connector according to the present invention.
Figure 3:
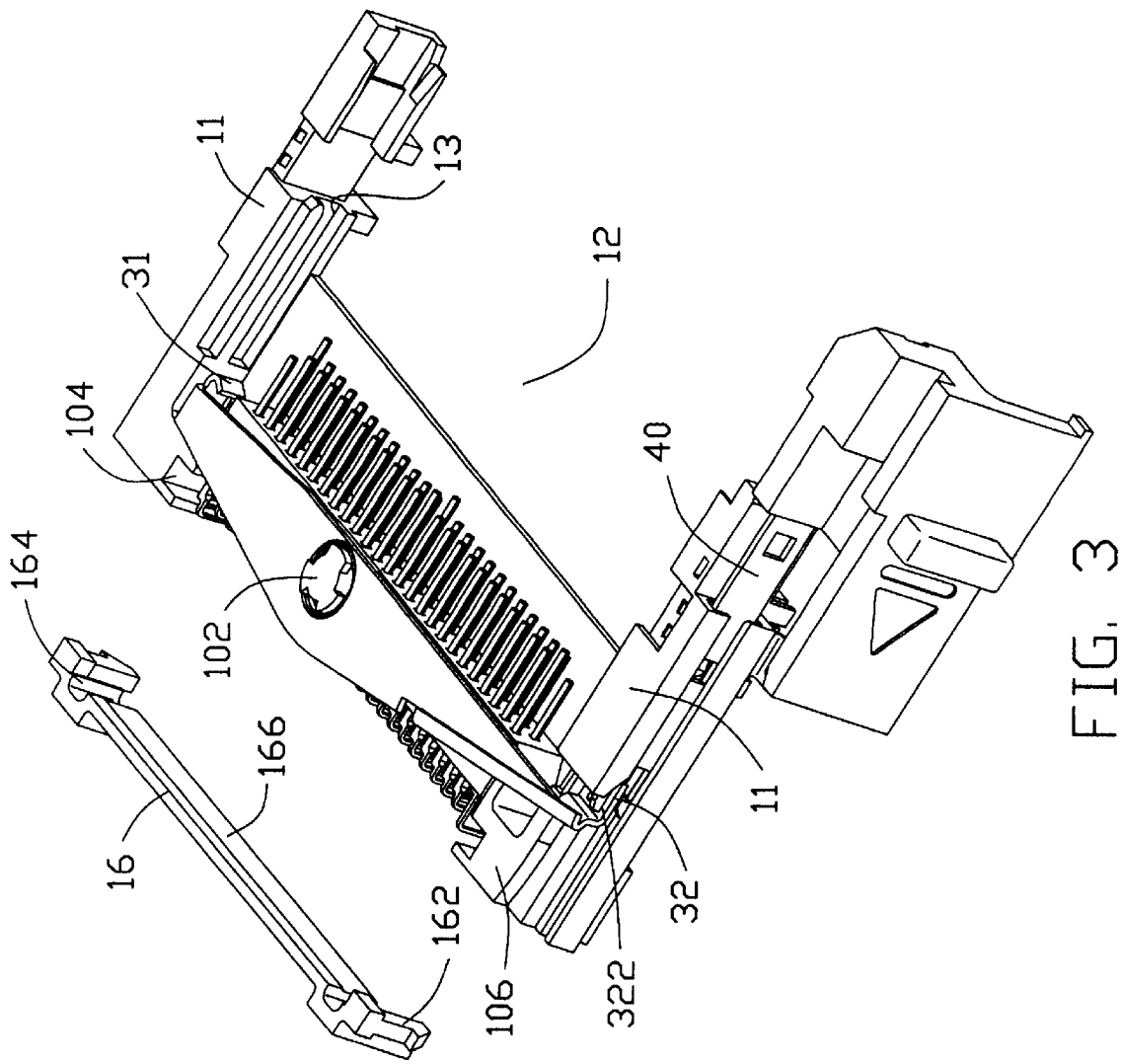
FIG. 3 is a partly exploded view of the card connector according to the present invention.

Referring to FIGS. 1 and 3, a card connector 1 comprises an insulative housing 10 retaining a plurality of contacts 20 therein. The housing 10 forms a pivot 102 extending from a top surface thereof. Two projections 106 extend from a front surface of the housing 10 and are spaced from and opposite to each other. Each projection 106 has a surface facing each other with a slot 104 defined therein. Two arms 11 extend from a rear surface of the housing 10 in a backwards direction and are spaced from each other, defining a receiving space 12 therebetween for selectively receiving a card (not shown).

Figure 4:
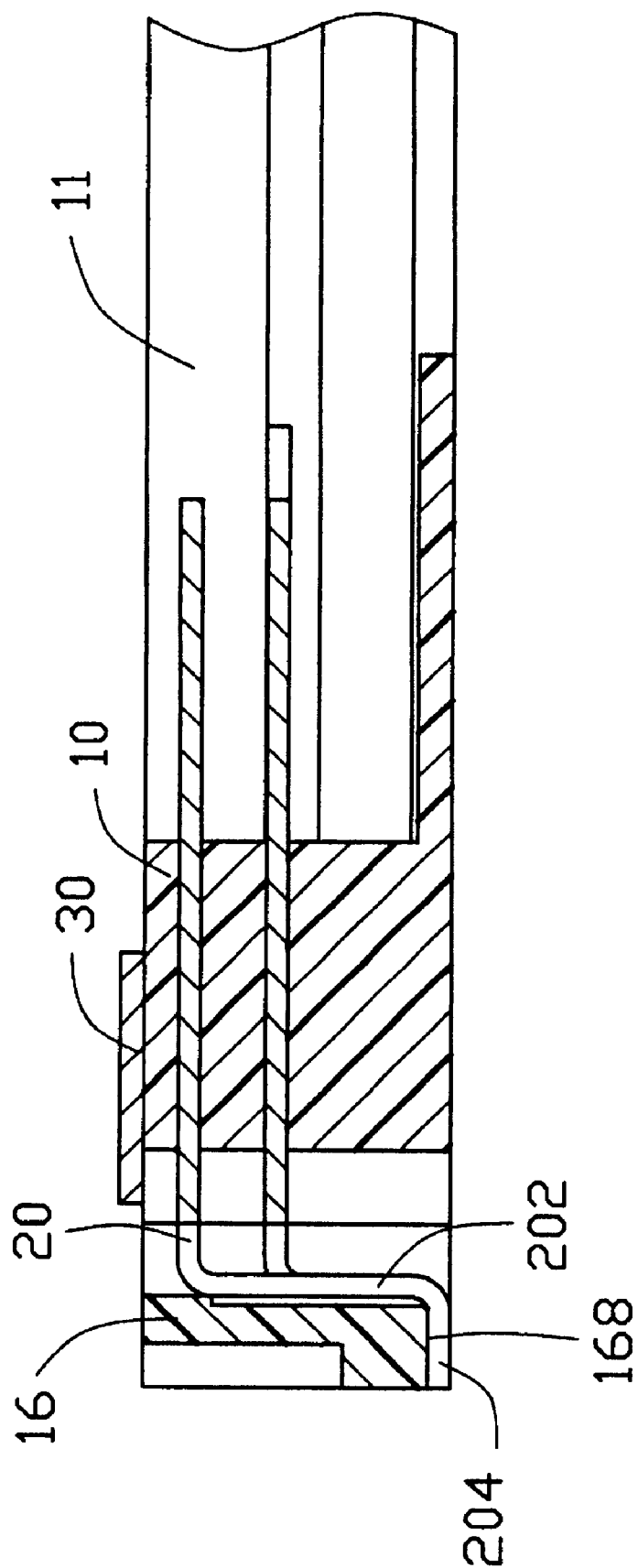
FIG. 4 is a cross-sectional view taken along line 4—4 of FIG. 3.

Also referring to FIG. 4, the contacts 20 are arranged to be substantially parallel to the arms 11 and each comprises a connecting portion 202 perpendicularly extending from the contact 20 in a downwards direction. The connecting portions 202 are arranged between the slots 104 of the projections 106. Each contact 20 further comprises a soldering portion 204 perpendicularly extending from a lower end of the connect portion 202 whereby the soldering portion 204 is substantially parallel to the contact 20.

Figure 2:
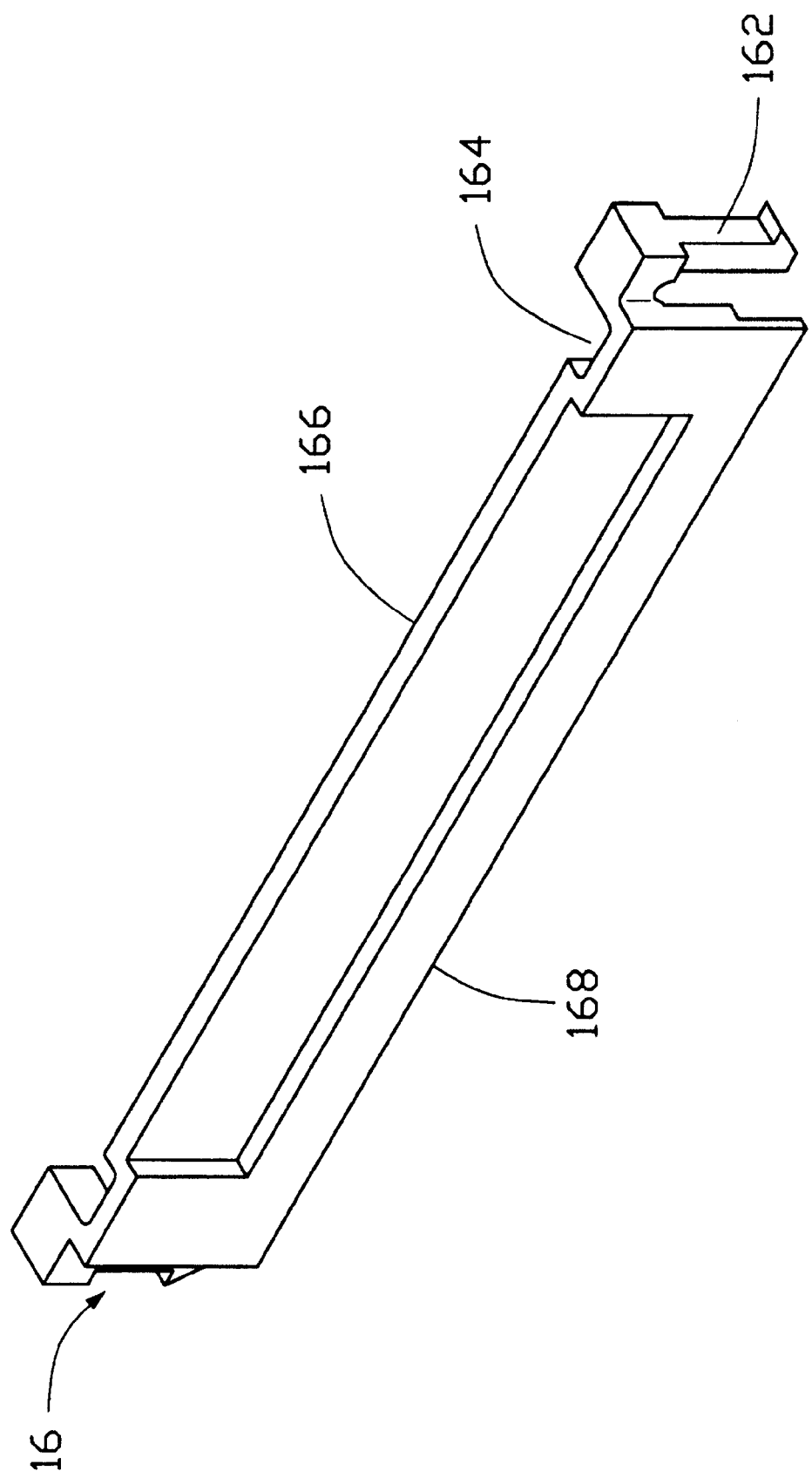
FIG. 2 is a perspective view of a spacer of the card connector according to the present invention.

Also referring to FIG. 2, a spacer 16 is received between the front projections 106 and comprises two arms 162 on opposite ends for receivingly engaging with the slots 104 to retain the spacer 16 in position. The spacer 16 has a back face 166 and a lower face 168, the back face 166 is arranged to engage, bias and retain the connecting portions 202 of the contacts 20 in a desired orientation with respect to the housing 10. If desired, the lower face 168 may be used to retain the soldering portions 204 of the contacts 20 in position. However, the use of the lower face 168 of the spacer 16 is dependent upon the design requirement of the connector 1 itself. The spacer 16 will be further described hereinafter.

First guiding means 13 is formed in an inner surface of each arm 11 for guiding the electronic card (not shown) into/out of the receiving space 12. The first guiding means 13 can be configured in the form of a channel along which the card can slide. Second guiding means 14 is formed in an outer surface of each arm 11.

The card connector 1 comprises a transmission 5. The transmission 5 comprises an ejection plate 30 and an ejection arm 40. The ejection plate 30 is assembled on the top surface of the housing 10. An aperture 33 is formed in a middle portion of the ejection plate 30 and rotatablely engages with the pivot 102 whereby the ejection plate 30 is rotatable about the pivot 102 with respect to the housing 10. A lug 32 defining a hole 322 is formed in one side of the ejection plate 30 to be movably coupled to the ejection arm 40 whereby when a user actuates the ejection arm 40, the ejection plate 30 is forced to rotate about the pivot 102. A piece 31 formed on the other side of the ejection plate 30 drives the card out of the connector when the ejection arm 40 is actuated. The ejection arm 40 is movably mounted on one of the arms 11 and guided by the second guiding means 14 to move along the arm 11. A projection 42 is formed on an end of the ejection arm 40 and rotatablely engages with the hole 322 of the lug 32 forming the coupling between the ejection arm 40 and the ejection plate 30. When the ejection arm 40 is pushed to move along the arm 11, the ejection arm 40 forces the ejection plate 30 to rotate about the pivot 102 through the coupling therebetween, thereby causing the piece 31 to drive and thus unload the card.

Due to manufacturing tolerance, when the contacts 20 are received and retained in the housing 10, the connecting portions 202 of the contacts 20 may not be perfectly aligned with each other and an included angle between each connecting portion 202 and an imaginary plane defined by all the contacts 20 may not be exactly or very close to 90 degrees. A variation of the included angle is in general present for each individual or some of the contacts 20. In general, the variation is around 2 degrees, making the included angle to be 92 degrees. In other words, assuming the imaginary plane is horizontal, theoretically, the connecting portion 202 are vertical and in practice, at least some of the connecting portions 202 are 2 degree forward inclined, causing the soldering portions 204 not to be in perfect alignment and tilting upwards.

The spacer 16 is sized and configured so that inserting the spacer 16 into the space between the front projections 106 of the housing 10 makes the back face 166 of the spacer 16 interferentially contact and force the connecting portions 202 to be vertical, and thus forcing the soldering portions 204 to be aligned with each other and substantially in a horizontal surface.

If desired, recesses 164 are defined in the spacer 16 for accommodating the connecting portions 202 of some of the contacts 20 having greater dimensions than the other contacts 20.

Although the present invention has been described with reference to the preferred embodiment thereof, it is apparent that the invention can be modified and enhanced by those skilled in the art without departing from the scope of the invention. These enhancement, improvements and modifications may nonetheless fall within the spirit and scope of the present invention defined in the following claims.

What is claimed is:

1. An electrical connector assembly comprising:

a housing with a pair of projections commonly defining a space thereamong;

a plurality of contacts retained in the housing with vertical connecting portions and horizontal soldering portions positioned in said space, the connecting portions of two opposite outermost contacts being forward offset from those of other contacts;

a pair of opposite slots respectively formed in the projections; and a spacer defining a lower face downwardly abutting against the soldering portions, a pair of arms latchably engaged within the corresponding slots; wherein said spacer further includes a pair of recesses positioned beside the corresponding pair of arms, respectively, to not only respectively accommodate the corresponding connecting portions of said two outermost contacts therein but also increase resiliency of the corresponding arm aside for easy assembling the spacer to the housing;

the housing having a front surface, a rear surface and a top surface;

two arms extending from the rear surface of the housing in a rearward direction;

the spacer being mounted to the front surface of the housing and having a back face interferentially engaging and elastically deforming the connecting portions of the contracts for placing the soldering portion of each contact in a desired angle with respect to the housing;

a transmission for unloading a card, the transmission comprising an ejection plate rotatably mounted on said top surface and an ejection arm coupled with one of said arms, the ejection plate and the ejection arm being driving coupled to each other.

* * * * *